(No Model.)
T. H. FROEHLICH.
EYE CUP.
No. 537,146. Patented Apr. 9, 1895.
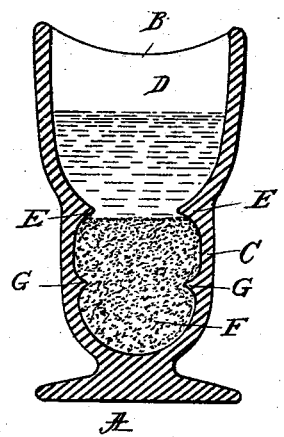
WITNESSES:
Edward C. Rowland
E. Simpson
INVENTOR
Theodore H. Froehlich
BY
Phillips Abbott
ATTORNEY

United States Patent Office.

THEODORE H. FROEHLICH, OF NEW YORK, N. Y., ASSIGNOR TO THE MEDICAL NOVELTY COMPANY, OF SAME PLACE.

EYE-CUP.

SPECIFICATION forming part of Letters Patent No. 537,146, dated April 9, 1895.

Application filed July 2, 1894. Serial No. 516,320. (No model.)

*To all whom it may concern:*

Be it known that I, THEODORE H. FROEHLICH, a citizen of the United States, and a resident of New York, in the county of New York and State of New York, have invented a certain new and useful Improved Eye-Cup, of which the following is a specification.

My invention relates to improvements in eye-cups, used by physicians and others, to wash or bath the eyes, and it consists in adding to the receptacle, which in the ordinary cups contains the liquid, a downwardly extending portion thereof, or what might be called an added chamber, the walls of which are substantially vertical, so as to retain the medicated material hereinafter referred to, or in some instances, the walls are provided with ledges for holding the medicated material in place. This medicated material, in the form of a cake or mass is deposited in the lower part of the chamber of the eye-cup and is of such a nature that it will be partially dissolved by the liquid placed in the upper part of the chamber, at each use of the device. The medicated material is preferably poured or pressed into the lower part of the chamber, when in fluid or plastic condition, and it will soon harden therein. The material which I employ, is a recently invented compound, prepared in a novel manner, for which an application for patent is now pending.

As above stated, in order that the medicated material may be more securely held in place in the lower part of the chamber of the cup, I sometimes construct ledges on the under-cut portions on the interior of the chamber beneath or about which the material will flow or may be pressed at the time of its introduction into the said lower part of the chamber. In other cases, however, the material will sufficiently attach itself to the walls of the chamber, which, as stated, are substantially vertical, and will not require any uneven surfaces to hold it.

In the drawing, I show a vertical sectional view of the invention.

A is the base of the cup.

B is the upper curved edge or rim of the liquid chamber. It is curved in a horizontal plane, and is also made elliptical in contour, so that it is adapted to fit against the lids of the eye and make a substantially water tight joint therewith—that is to say, the rim of the cup is made concave, so that it fits the convex outline of the lids of the eye of the user.

C is the lower part of the chamber of the cup, which is constricted or of less diameter than the lower part, and is placed between the liquid chamber D and the base A. It takes the place of the standard of eye-cups, as they are usually made.

E is an inwardly extending ledge, at or near the top of the lower part of the chamber, beneath which the medicated material, F, will be held.

G is another ledge, which may be located about midway of the height of the lower part of the chamber, which will hold the medicated material when so much of it has been dissolved by continued use of the device, as to preclude further holding action by the upper ledge E. There may be as many of these ledges as desired, but, as above stated, they will not always be necessary, since the medicated material will sufficiently attach itself to the walls of the lower chamber; under all ordinary circumstances, those walls being substantially vertical.

It will be observed that by my invention, I secure several very important results.

First. The annoyance and trouble of preparing the medicated liquid at each use of the device, is avoided. This is frequently of great importance, because those who have used such devices are frequently so situated as for instance, when traveling, that the materials for compounding the medicated bath, cannot be obtained.

Second. The medicated cake or mass, which is deposited in the chamber, is, under my invention, scientifically and accurately compounded by the chemists, who make it. Thus injury to the eye of the patient, because of faulty mixing of the medicated material is avoided.

Third. The convenience of use of the device, is greatly increased, because all that is necessary is to pour a small quantity of water into the upper or water tight part of the chamber, which, after standing a minute or so to dissolve a portion of the upper part of the medicated material, is ready for application, in the usual manner; and after the bath, the balance of the liquid remaining in the chamber may be thrown out, and the device immediately placed in a satchel or other desired place, ready for a second use.

I claim—

1. An eye-cup having a concave upper rim, a chamber having a constricted lower portion, the larger or upper part of the chamber being adapted to hold liquid and the lower or constricted part adapted to receive a deposit of medicated material, and a ledge or holding surface for the medicated material, substantially as set forth.

2. An eye-cup having a concave rim, a chamber having a constricted lower portion, the larger or upper part of said chamber being adapted to hold liquid, the lower part having substantially vertical walls, whereby it is adapted to receive and hold a deposit of medicated material, and a base for the device as a whole, substantially as set forth.

Signed at New York, in the county of New York and State of New York, this 28th day of June, A. D. 1894.

THEODORE H. FROEHLICH.

Witnesses:
PHILLIPS ABBOTT,
E. SIMPSON.